United States Patent [19]

Huber et al.

[11] 4,357,252

[45] Nov. 2, 1982

[54] SILOXANE BREAK FLUID COMPOSITIONS CONTAINING R'SIO$_{\frac{3}{2}}$ UNITS

[75] Inventors: Peter Huber, Burghausen; Jürgen Meusel, Burgkirchen, both of Fed. Rep. of Germany

[73] Assignee: Wacker-Chemie GmbH, Munich, Fed. Rep. of Germany

[21] Appl. No.: 290,762

[22] Filed: Aug. 7, 1981

[30] Foreign Application Priority Data

Oct. 21, 1980 [DE] Fed. Rep. of Germany ....... 3039736

[51] Int. Cl.$^3$ ............................................. C09K 5/00
[52] U.S. Cl. .................................... 252/78.3; 252/573
[58] Field of Search ....................................... 252/78.3

[56] References Cited

U.S. PATENT DOCUMENTS 4,155,864  5/1979  Martin ................................. 252/78.3

Primary Examiner—John D. Welsh

[57] ABSTRACT

Brake fluids containing at least 80 percent by weight based on the weight of the brake fluids of an organopolysiloxane containing triorganosiloxy endblocking units, diorganosiloxane units and from 0.5 to 20 mole percent of units of the formula R'SiO$_{\frac{3}{2}}$ where R' represents the same or different monovalent aryl, alkaryl or aralkyl radicals or halogenated monovalent aryl, alkaryl or aralkyl radicals, in which at least 99 percent of the number of silicon valences are saturated by hydrocarbon radicals, halogenated hydrocarbon radicals, cyanoalkyl radicals or siloxane oxygen atoms.

5 Claims, No Drawings

SILOXANE BREAK FLUID COMPOSITIONS CONTAINING R'SiO₃ UNITS

The present invention relates to fluids and more particularly to silicone containing brake fluids.

Silicone fluids have been used heretofore as hydraulic fluids. For example, U.S. Pat. No. 4,137,189 to Holbrook et al discloses a hydraulic fluid containing (1) 89.5 to 94.75 percent by weight of a siloxane fluid having a viscosity of less than 10,000 centistokes at 25° C., in which the siloxane fluid is composed of $R'SiO_{3/2}$ units, where R' is an alkyl group, $R_2''SiO$ units and $R_3''SiO_{\frac{1}{2}}$ units, wherein at least 95 percent of the R" radicals are methyl radicals, there being from 1 to 10 mole percent of the $R'SiO_{3/2}$ units in the siloxane fluid, and the mole ratio of the $R'SiO_{3/2}$ units to the $R_3''SiO_{\frac{1}{2}}$ units in the siloxane fluid being less than 1,2, (2) 5 to 10 percent by weight of a chlorendate, and (3) 0.25 to 0.5 percent by weight of a compound selected from the group consisting of metal phosphorodithioates or dithiocarbamates.

U.S. Pat. No. 3,821,114 Brown, Jr. discloses a hydraulic fluid comprising a silicone polymer having from 75 to 95 mole percent of

units or $R_2SiO$ units in combination with 5 to 25 mole percent of

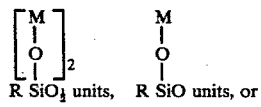

R $SiO_{3/2}$ units or mixtures thereof, in which the molar amount of MO groups present, based on the total moles of R and MO groups present is at least 5 mole percent and the viscosity of the polymer is from 5 to 200 centistokes at 25° C. Each R is a monovalent hydrocarbon radical or a halogenated monovalent hydrocarbon radical or cyanoalkyl radical, M is R-, ROR', ROR'OR'-, $ROC_xH_{2x})_n$-, $(RO)_2R''$ or

where R' is a divalent hydrocarbon radical or a halogenated divalent radical, R" is a trivalent hydrocarbon radical or a halogenated trivalent hydrocarbon radical, x is 2, 3 or 4 and n is at least 5.

British Pat. No. 1,445,850 to General Electric Company, discloses a silicone hydraulic fluid containing (1) from 40 to 99 percent by weight based on the weight of the fluid of a linear polymeric silicone of the formula

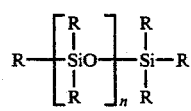

where R is a monovalent hydrocarbon radical and n varies from 1 to 2,000 and (2) from 1 to 60 percent by weight of a fluid which has a tolerance for water.

British Pat. No. 932,435 to General Electric Company discloses a method for stabilizing alkylchlorophenyl organopolysiloxanes containing 0.5 to 10 parts by weight per 100 parts by weight of the polysiloxane of an iron salt stabilizer which comprises adding to the iron stabilized organopolysiloxanes from 0.1 to 1.0 percent by weight of mineral spirits having a boiling point of at least 200° C. or a fused ring polycyclic aromatic hydrocarbon of at least three rings having a melting point no higher than 200° C. and a boiling point of at least 200° C.

U.S. Pat. No. 2,614,989 to Hunter et al describes blends of copolymeric siloxane fluids containing (1) a copolymeric polysiloxane fluid having a viscosity of at least 50,000 cs. at 25° C. and (2) a copolymeric siloxane fluid having a viscosity of from 20 cs. to 125 cs. at 25° C. The high viscosity fluid (1) has a composition of from 92 to 98 mol percent dimethylsiloxane units and from 8 to 2 mol percent of siloxanes of the type R R' SiO, where R and R' are alkyl radicals and monocyclic aryl radicals. The low viscosity fluid (2) contains from 80 to 98 mol percent siloxane units of the type R R' SiO and $R'SiO_{1.5}$. Also, the copolymeric fluid (2) may contain up to 10 mol percent of triorganosiloxane units.

U.S Pat. No. 2,990,373 to Ragborg describes a siloxane fluid containing (1) from 45 to 95 percent by weight of a methylpolysiloxane fluid with up to 30 mol percent of copolymerized phenylsiloxane, (2) from 5 to 55 percent by weight of an oxide of a metal of groups IIB to VIII of the periodic series of elements and (3) up to 50 percent by weight of a hydrocarbon oil compatible with (1).

German Patent Application 27 19 938 to Wacker-Chemie GmbH describes a mixture containing triorganosiloxy endblocked diorganopolysiloxanes and from 1 to 10 weight percent of a cyclic diorganopolysiloxane having at least 7 diorganosiloxane units per molecule.

In contrast to the fluids described above, the brake fluids of this invention have a low viscosity at low temperatures, and yet have a sufficiently high viscosity at high operating temperatures, have better lubricating properties and exhibit controlled swelling properties on rubber parts which are in contact with these fluids. Also, these brake fluids are more heat resistant and are more compatible with other additives which are generally present in brake fluids.

It is, therefore, an object of this invention to provide silicone fluids which are useful as brake fluids. Another object of this invention is to provide silicone fluids which have a low viscosity at low temperatures. Still another object of this invention is to provide silicone fluids which have better lubricating properties, but exhibit controlled swelling on rubber parts which are in contact with these fluids. A further object of the present invention is to provide silicone fluids which are more heat resistant and are more compatible with other brake fluid additives.

SUMMARY OF THE INVENTION

The foregoing objects and others which will become apparent from the following description are accomplished in accordance with this invention, generally speaking, by providing a brake fluid or as a component of a brake fluid, silicone fluids containing an organopolysiloxane having (a) from 30 to 98 mole percent of units of the formula $R_2SiO$, (b) from 0.5 to 20 mole percent of units of the formula $R'SiO_{3/2}$, (c) from 0.1 to 20 mole percent of units of the formula $R_3SiO_{1/2}$, (d) from 0 to 20 mole percent of units of the formula $RSiO_{3/2}$, and (e) from 0 to 10 mole percent of units of the formula $R'RSiO$, where R represents the same or different monovalent aliphatic hydrocarbon radicals, halogenated monovalent aliphatic hydrocarbon radicals or cyanoalkyl radicals and R' represents the same or different, monovalent, aryl, alkaryl or aralkyl radicals, or halogenated monovalent aryl, alkaryl or aralkyl radicals, where 99 percent of the number of silicon valences are saturated by R, R' or siloxane oxygen atoms and the sum of the mole percentages is equal to 100. The organopolysiloxanes are present in the brake fluid in an amount of at least 80 percent by weight based on the weight of the brake fluid.

It is preferred that from 0.1 to 3 mole percent of the units present in the organopolysiloxanes have the following formula $R_3SiO_{1/2}$.

Moreover, it is preferred that the organopolysiloxane employed in this invention contain only the following units:

90 to 97 mole percent of units of the formula $R_2SiO$, 2 to 8 mole percent of units of the formula $R'SiO_{3/2}$ and 1 to 3 mole percent of units of the formula $R_3SiO_{1/2}$, in which R and R' are the same as above.

Examples of aliphatic hydrocarbon radicals represented by R are alkyl radicals such as the methyl, ethyl, propyl, butyl and octyl radicals; cycloalkyl radicals such as the cyclohexyl radical and alkenyl radicals such as the vinyl radical. Examples of halogenated aliphatic hydrcarbon radicals represented by R are the chloromethyl and the 3,3,3-trifluoropropyl radical. An example of a cyanoalkyl radical is the cyanoethyl radical. Because they are readily available, it is preferred that at least 90 percent of the radicals represented by R be methyl radicals.

The phenyl radical is the most preferred example of an aryl radical and it is preferred as the R' radical. Examples of alkaryl radicals are the tolyl radicals while an example of an aralkyl radical is the benzyl radical.

The siloxane oxygen atoms mentioned heretofore are oxygen atoms linked to silicon atoms as represented by the following group $\equiv Si-O-Si\equiv$.

It is preferred that the organopolysiloxanes used in these brake fluids have a viscosity of from 10 to 250 $mm^2/s$ at 25° C.

In the brake fluids of this invention one type of organopolysiloxane or a mixture of two or more types of organopolysiloxanes may be employed.

The organopolysiloxanes used in the brake fluids of this invention can be prepared, for example, by cohydrolyzing a silane of the formula $R_2SiCl_2$ with silanes of the formulas $R'SiCl_3$ and $R_3SiCl$ in a suitable quantitative ratio. Also, these organopolysiloxanes can be prepared by equilibrating suitable organopolysiloxanes in the presence of basic catalysts such as potassium hydroxide or silanolates, or by means of acid catalysts such as phosphoronitrilochloride, hydrochloric acid, sulfuric acid or acid-activated clays or acid-activated silicas, and thereafter removing the volatile components in order to obtain a product having a flash point above 200° C.

Examples of additional materials which may be incorporated in the brake fluids of this invention in amounts of up to about 20 percent by weight based on the total weight of the brake fluid, are additives which serve to impart controlled swelling properties to rubber parts which are in contact with the brake fluids, such as dicarboxylic acid esters. Examples of such additives are dioctylesters of sebacic acid, adipic acid, or formic acid, lubricants such as chlorendate, molybdenum disulfide, graphite or phosphorus or sulfur compounds, as well as corrosion-inhibitors, such as amines and aminoalkylsiloxanes.

It is preferred that the brake fluids of this invention contain at least 0.1 percent by weight, based on the total weight of the brake fluid, of a substance other than the organopolysiloxane described heretofore.

The brake fluids of this invention have lower viscosities at lower temperatures, have improved lubricating properties and exhibit better controlled swelling properties on rubber parts, such as neoprene, styrene-butadiene rubber (SBR) or terepolymers made from ethylene-propylene-diene monomers (EPDM), which are generally present in hydraulic systems. Also, the brake fluids of this invention are more heat-resistant and display better compatibility with the additives which are generally employed in brake fluids.

EXAMPLE

To a 5 liter, 3-necked flask equipped at the bottom with an outlet valve and containing a mixture of toluene and water, is slowly added a mixture consisting of 94 mole percent of dimethyldichlorosilane, 3 mole percent phenyltrichlorosilane and 3 mole percent trimethylchorosilane. The acid present in the toluene phase is removed by washing with water and the toluene is distilled off. The components which boil at 13332 Pa (abs.) are then removed by distillation at a flask temperature of 160° C.

According to the Si 29-reasonance analysis, the resultant organopolysiloxane consists of 93.5 mole percent dimethylsiloxane, 5 mole percent monophenylsiloxane and 1.5 mole percent trimethylsiloxane units. The viscosity of the resultant organopolysiloxane is 57 $mm^2/s$ at 25° C. and its freezing point is below −65° C.

The "Almen-Wieland" test yields a maximum pressure of 0.784 mPa (abs.). When styrene-butadiene (SBR) rubber sleeves are heated at 120° C. for 70 hours in the presence of the organopolysiloxanes, and in the absence of an additive, they increase 2.2 percent by volume.

What is claimed is:

1. A brake fluid containing an organopolysiloxane having
   (a) from 30 to 98 mole percent of units of the formula $R_2SiO$,
   (b) from 0.5 to 20 mole percent of units of the formula $R'SiO_{3/2}$,
   (c) from 0.1 to 20 mole percent of units of the formula $R_3SiO_{1/2}$, (d) from 0 to 20 mole percent of units of the formula RSiO$_{3/2}$ and (e) from 0 to 10 mole percent of units of the formula R'SiO, in which R is selected from the group consisting of monovalent, aliphatic hydrocarbon radicals, halogenated monovalent aliphatic hydrocarbon radicals and cyanoalkyl radicals, R' is selected from the group consisting of monovalent aryl, alkaryl and aralkyl radicals and halogenated monovalent aryl, alkaryl and aralkyl radicals, in which at least 99 percent of the number of the silicon valences are saturated by radicals selected from the group consisting of R, R' and siloxane oxygen atoms and the sum of the mole percentages of (a), (b), (c), (d) and (e) is equal to 100.

2. The brake fluid of claim 1, wherein the organopolysiloxane is present in an amount of at least 80 percent by weight based on the total weight of the brake fluid.

3. The brake fluid of claims 1 or 2, in which the organopolysiloxane contains from 0.1 to 3 mole percent of units of the formula R$_3$SiO$_{\frac{1}{2}}$ in which R is selected from the group consisting of monovalent aliphatic hydrocarbon radicals, halogenated monovalent aliphatic hydrocarbon radicals and cyanoalkyl radicals.

4. The brake fluid of claims 1 or 2, wherein the organopolysiloxane contains (a) 90 to 97 mole percent of units of the formula R$_2$SiO, (b) 2 to 8 mole percent of units of the formula R'SiO$_{3/2}$ and (c) 1 to 3 mole percent of units of the formula R$_3$SiO$_{\frac{1}{2}}$ in which R is selected from the group consisting of monovalent aliphatic hydrocarbon radicals, halogenated monovalent aliphatic hydrocarbon radicals and cyanoalkyl radicals, R' is selected from the group consisting of monovalent aryl, alkaryl and aralkyl radicals and halogenated monovalent aryl, alkaryl and aralkyl radicals, in which at least 99 percent of the number of the silicon valences are saturated by radicals selected from the group consisting of R, R' and siloxane oxygen atoms and the sum of the mole percentages of (a), (b) and (c) being equal to 100.

5. The brake fluid of claims 1 or 2, wherein R represents a methyl radical and R' represents a phenyl radical.

* * * * *